US010007883B2

United States Patent
Bhattacharya et al.

(10) Patent No.: US 10,007,883 B2
(45) Date of Patent: Jun. 26, 2018

(54) MULTIPLE CRITERIA DECISION ANALYSIS

(71) Applicant: Indian Institute of Technology Kanpur, Kanpur (IN)

(72) Inventors: Arnab Bhattacharya, Kanpur (IN); Avani Nandini, Hajipur (IN)

(73) Assignee: INDIAN INSTITUTE OF TECHNOLOGY KANPUR, Uttar Pradesh (IN)

( * ) Notice: Subject to any disclaimer, the term of this patent is extended or adjusted under 35 U.S.C. 154(b) by 431 days.

(21) Appl. No.: 14/429,064

(22) PCT Filed: Apr. 25, 2013

(86) PCT No.: PCT/IB2013/053261
§ 371 (c)(1),
(2) Date: Mar. 18, 2015

(87) PCT Pub. No.: WO2014/049453
PCT Pub. Date: Apr. 3, 2014

(65) Prior Publication Data
US 2015/0220849 A1 Aug. 6, 2015

(30) Foreign Application Priority Data
Sep. 27, 2012 (IN) .......................... 3027/DEL/2012

(51) Int. Cl.
*G06N 7/00* (2006.01)
*G06Q 10/06* (2012.01)

(52) U.S. Cl.
CPC .......... *G06N 7/005* (2013.01); *G06Q 10/063* (2013.01)

(58) Field of Classification Search
CPC ............................. G06N 7/005; G06Q 10/063
See application file for complete search history.

(56) References Cited

U.S. PATENT DOCUMENTS

| 7,299,220 B2 | 11/2007 | Chaudhuri et al. |
| 7,908,264 B2 | 3/2011 | Bohannon et al. |
| (Continued) | | |

FOREIGN PATENT DOCUMENTS

| CN | 101895547 A | 11/2010 |
| CN | 102254016 A | 11/2011 |
| (Continued) | | |

OTHER PUBLICATIONS

Bhattacharya, A., & Teja, B. P. (2010). Aggregate Skyline Join Queries: Skylines with Aggregate Operations over Multiple Relations. International Conference on Management of Data COMAD 2010, Nagpur, India, Dec. 8-10, 2010.*
(Continued)

*Primary Examiner* — Christyann R Pulliam
*Assistant Examiner* — Oluwatosin Alabi

(57) ABSTRACT

Embodiments of the present disclosure set forth methods for selecting a preferred data set. The methods include generating a joined relation based on a first relation having a first join attribute and a first existence probability attribute, and a second relation having a second join attribute compatible with the first join attribute and a second existence probability attribute, wherein the joined relation comprises a skyline probability attribute based at least in part on the product of a second value of the first existence probability attribute and a third value of the second existence probability attribute; and selecting, by one or more processors, the preferred data set from the joined relation based on a comparison of the first value of the skyline probability attribute and a predetermined threshold.

27 Claims, 6 Drawing Sheets

(56) References Cited

U.S. PATENT DOCUMENTS

| | | | |
|---|---|---|---|
| 8,468,174 | B1 | 6/2013 | Yueh et al. |
| 8,504,581 | B2* | 8/2013 | Bhattacharya .... G06F 17/30442 707/758 |
| 2007/0198439 | A1 | 8/2007 | Shriraghav et al. |
| 2008/0052269 | A1 | 2/2008 | Abdo et al. |
| 2008/0147587 | A1 | 6/2008 | Yokoyama |
| 2008/0168015 | A1 | 7/2008 | Thie et al. |
| 2008/0294648 | A1 | 11/2008 | Lin et al. |
| 2013/0103371 | A1* | 4/2013 | Huang .................... G06N 7/005 703/2 |
| 2016/0004702 | A1* | 1/2016 | Bhattacharya .... G06F 17/30557 707/748 |

FOREIGN PATENT DOCUMENTS

| | | |
|---|---|---|
| CN | 102323957 A | 1/2012 |
| CN | 103150326 A | 6/2013 |
| CN | 103150327 A | 6/2013 |
| CN | 103150336 A | 6/2013 |
| CN | 103308314 A | 9/2013 |

OTHER PUBLICATIONS

Sen, P., Deshpande, A., & Getoor, L. (Oct. 2007). Representing tuple and attribute uncertainty in probabilistic databases. In Data Mining Workshops, 2007. ICDM Workshops 2007. Seventh IEEE International Conference on (pp. 507-512). IEEE.*

Atallah, M. J., & Qi, Y. (Jun. 2009). Computing all skyline probabilities for uncertain data. In Proceedings of the twenty-eighth ACM SIGMOD-SIGACT-SIGART symposium on Principles of database systems (pp. 279-287). ACM.*

Tan, K. L., Eng, P. K., & Ooi, B. C. (Sep. 2001). Efficient progressive skyline computation. In VLDB (vol. 1, pp. 301-310).*

Suciu, D., Olteanu, D., Ré, C., & Koch, C. (2011). Probabilistic databases. Synthesis Lectures on Data Management, 3(2), 1-180.*

Vlachou, A., Doulkeridis, C., & Polyzotis, N. (Jun. 2011). Skyline query processing over joins. In Proceedings of the 2011 ACM SIGMOD International Conference on Management of data (pp. 73-84). ACM (Year : 2011).*

Khalefa, M. E., Mokbel, M. F., & Levandoski, J. J. (Apr. 2011). Prefjoin: An efficient preference-aware join operator. In Data Engineering (ICDE), 2011 IEEE 27th International Conference on (pp. 995-1006). IEEE. (Year: 2011).*

Arnab Bhattacharya et al., "Aggregate Skyline Join Queries: Skylines with Aggregate Operations over Multiple Relations", In COMAD, Dec. 8-10, 2010, India.

Wen Jin et al., "The Multi-Relational Skyline Operator", In IEEE ICDE, 2007, pp. 1276-1280.

Dalie Sun et al., "Skyline-Join in Distributed Databases", In IEEE ICDE, 2008, pp. 176-181.

Christian Bohm et al., "Skyline Operators for Existentially Uncertain Data", In ACM QUeST'09, Nov. 3, 2009.

Mohamed A. Soliman et al., "URank: Formulation and Efficient Evaluation of Top-k Queries in Uncertain Databases", In SIGMOD'07, Jun. 12-14, 2007, pp. 1082-1084.

Ilaria Bartolini et al., "SaLsa: Computing the Skyline without Scanning the Whole Sky", In CIKM'06, Nov. 5-11, 2006, pp. 405-414.

Stephan Borzsonyi et al., "The Skyline Operator", In IEEE ICDE, 2001, pp. 421-430.

Surajit Chaudhuri et al., "Robust Cardinality and Cost Estimation for Skyline Operator", In ICDE, 2006, Publisher: Insittute of Electrical and Electronics Engineers, Inc.

Jan Chomicki et al., "Skyline with Presorting", In ICDE'03, 2003, pp. 717-719, IEEE.

Ronald Fagin et al., "Optimal Aggregation Algorithms for Middleware", In PODS'01, 2001, pp. 102-113.

Parke Godfrey et al., "Maximal Vector Computation in Large Data Sets", In Proceeding of the 31st VLDB Conference, 2005, pp. 229-240.

Jonathan Goldstein et al., "Processing Queries by Linear Constraints", In PODS, ACM, 1997, pp. 257-267.

Donald Kossmann et al., "Shooting Stars in the Sky: An Online Algorithm for Skyline Queries", In Proceedings of the 28th VLDB Conference, 2002, pp. 275-286.

H. T. Kung et al., "On Finding the Maxima of a Set of Vectors", Journal of the Association for Computing Machinery, Oct. 1975, pp. 469-476, vol. 22, No. 4.

Chuang Liu et al., "Design and Evaluation of a Resource Selection Framework for Grid Applications", In Proceeding HPDC'02, 2002, p. 63, IEEE Computer Society.

Dimitris Papadias et al., "An Optimal and Progressive Algorithm for Skyline Queries", In ACM SIGMOD, Jun. 9-12, 2003, pp. 467-478.

Michael Stonebraker et al., "Content Integration for E-Business", In ACM SIGMOD, May 21-24, 2001, pp. 552-560.

Jian Pei et al., "Probabilistic Skylines on Uncertain Data", In VLDB'07, Sep. 23-28, 2007.

International Search Report and the Written Opinion of the International Authority, International Application No. PCT/IB13/53261, Nov. 1, 2013.

Arnab Bhattacharya et al., "Aggregate Skyline Join Queries: Skylines with Aggregate Operations over Multiple Relations", In: International Conference on Management of Data, COMAD 2010, Dec. 8-10, 2010 [Online] [retrieved on Oct. 15, 2013] Retrieved from the Internet <URL:http://arxiv.org/abs/1206.6646>, entire document, especially Abstract; pp. 11.

Yinian Qi et al., "Identifying Interesting Instances for Probabilistic Skylines", In: International Conference on Database and Expert Systems Applications, DEXA 2010, Aug. 30-Sep. 3, 2010, [Online] [retrieved on Oct. 15, 2013] Retrieved from the Internet URL <http://dl.acm.org/citation.cfm?id=1887601>, entire document, especially Abstract; pp. 1-3, 9-10.

Bin Jiang et al., "Probabilistic Skylines on Uncertain Data: Model and Bounding-Pruning-Refining Methods", In Journal Intelligent Information Systems, 2010, Publisher: Springer Science+Business Media, LLC.

Xiang Lian et al., "Probabilistic Group Nearest Neighbor Queries in Uncertain Databases", IEEE Transactions on Knowledge and Data Engineering, Jun. 2008, pp. 809-824, vol. 20, No. 6, Publisher: IEEE Computer Society.

Yinian Qi et al., "Identifying Interesting Instances for Probabilistic Skylines", Computer Science Technical Reports, Dec. 9, 2009, Paper 1724, also available at <URL: http://docs.lib.purdue.edu/cgi/viewcontent.cgi?article=2723&context=cstech>.

Hannes Eder, "On Extending PostgreSQL with the Skyline Operator," Jan. 27, 2009, Accessed at <URL: http://web.archive.org/web/20111222065210/http://skyline.dbai.tuwien.ac.at/thesis-heder-twoside-web-200901271.pdf> (part I—pp. 1-42) / (part II—pp. 43-97).

Jianmei Hunag et al., "Tuning the Cardinality of Skyline", APWeb 2008 Workshops, 2008, pp. 220-231, Springer-Verlag Berlin Heibelberg.

Mikhail J. Atallah et al., "Computing All Skyline Probabilities for Uncertain Data", PODS'09, Jun. 20-Jul. 2, 2009, pp. 279-287.

Christian Bohm et al., "Skyline Operators for Existentially Uncertain Data", ACM QueST'09, Nov. 3, 2009, pp. 8.

Jian Pei et al., "Probabilistic Skylines on Uncertain Data", VLDB'07, Sep. 23-28, 2007, pp. 12.

International Preliminary Report on Patentability, International Application No. PCT/IB13/53261, dated Feb. 3, 2015.

Shaul Dar et al., "Extending SQL with Generalized Transitive Closure", IEEE Transactions on Knowledge and Data Engineering, Oct. 1993, pp. 799-812, vol. 5, No. 5.

Xiaofeng Ding et al., "Efficient and Progressive Algorithms for Distributed Skyline Queries over Uncertain Data", 2010 International Conference on Distributed Computing Systems, IEEE, 2010, pp. 149-0158.

(56) References Cited

OTHER PUBLICATIONS

Xiaofeng Ding et al., "Efficient and Progressive Algorithms for Distributed Skyline Queries over Uncertain Data", IEEE Transactions on Knowledge and Data Engineering, Aug. 2012, pp. 1448-1462, vol. 24, No. 8.

R. A. Finkel et al., "Quad Trees: a Data Structure for Retrieval on Composite Keys", Acta Informatica, 1974, pp. 1-9, vol. 4.

Antonin Guttman, "R-Trees: A Dynamic Index Structure for Spatial Searching", Proceedings of the 1984 ACM SIGMOD international conference on Management of data, 1984, pp. 47-57, vol. 14, No. 2.

Katja Hose et al., "A Survey of Skyline Processing in Highly Distributed Environments", The International Journal on Very Large Data Bases, 2012, pp. 359-384, vol. 21.

International Search Report and Written Opinion of the International Searching Authority, International application No. PCT/IB2014/059087, dated Jun. 13, 2014.

M. Morse et al., "Efficient Continuous Skyline Computation", Journal of Information Sciences, 2007, pp. 3411-3437, vol. 177.

Shashwat Mishra, "Probabilistic Skyline Queries in Distributed Environments with Low Message Overhead", Department of Computer Science and Engineering of Indian Institute of Technology Kanpur, Jun. 2013, pp. 68.

Joao B. Rocha-Junior et al., "AGiDS: A Grid-Based Strategy for Distributed Skyline Query Processing", Proceeding of second International conference globe, Sep. 1-2, 2009, pp. 12-23, vol. 5697.

Palvali Teja B, "Improving the Efficiency and Extending the Scope of Skyline Operator", Department of Computer Science and Engineering of Indian Institute of Technology Kanpur, May 2010, pp. 75.

B. Palvali Teja, "Complex Query Processing in Large Databases," Its my view blog, May 10, 2010, pp. 2.

Akrivi Vlachou et al., "Skypeer: Efficient Subspace Skyline Computation over Distributed Data", IEEE 23rd International Conference on Data Engineering, Apr. 15-20, 2007, pp. 416-425.

Xiaowei Wang et al., "Grid-Based Probabilistic Skyline Retrieval on Distributed Uncertain Data", DASFAA Workshops 2011, 2011, pp. 538-547.

Hao Yuan et al., "Efficient Data Structures for Range-Aggregate Queries on Trees", ICDT 2009, Mar. 23-25, 2009, pp. 111-120.

Zhenjie Zhang et al., "Kernel-Based Skyline Cardinality Estimation", SIGMOD'09, Jun. 29-Jul. 2, 2009, pp. 509-522.

Zhenjie Zhang et al., "Minimizing the Communication Cost for Continuous Skyline Maintenance", SIGMOD'09, Jun. 29-Jul. 2, 2009, pp. 495-508.

\* cited by examiner

|     | $B_1$ | $B_2$ | $B_3$ | $B_4$ | $B_4'$ |
|-----|-------|-------|-------|-------|--------|
| $A_1$ | ■ | ■ | ■ | ■ | ☐ |
| $A_2$ | ■ | ■ | ■ | ■ | ☐ |
| $A_3$ | ☐ | ☐ | ☐ | ☐ | ☐ |
| $A_3'$ | ☐ | ☐ | ☐ | ☐ | ☐ |

FIG. 2C

300 A computer program product

304 A signal bearing medium 302 at least one of one or more instructions for generating a joined relation based on a first relation having a first join attribute and a first existence probability attribute and a second relation having a second join attribute compatible with the first join attribute and a second existence probability attribute, wherein the joined relation comprises a skyline probability attribute based at least in part on the product of a second value of the first existence probability attribute and a third value of the second probability attribute; and/or one or more instructions for selecting the preferred data set from the joined relation based on a comparison between the first value of the skyline probability attribute and a predetermined threshold 306 a communication medium 308 a non-transitory computer readable medium 310 a recordable medium

FIG. 3

MULTIPLE CRITERIA DECISION ANALYSIS

CROSS-REFERENCE TO RELATED APPLICATIONS

The present application is a U.S. National Stage filing under 35 U.S.C. § 371 of International Application No. PCT/IB2013/053261, filed on Apr. 25, 2013, entitled "MULTIPLE CRITERIA DECISION ANALYSIS." International Application No. PCT/IB2013/053261 claims priority under 35 U.S.C. ≡119(a) to Indian Patent Application No. 3027/DEL/2012, filed on Sep. 27, 2012. Indian Patent Application No. 3027/DEL/2012 and International Application No. PCT/IB2013/053261, including any appendices or attachments thereof, are hereby incorporated by reference in their entirety.

BACKGROUND OF THE DISCLOSURE

Multiple criteria decision analysis generally refers to an approach of making numerous and sometimes conflicting evaluations among multiple relations having various uncertainties. A preferable data set may be selected from the relations based on some preset preferences.

BRIEF DESCRIPTION OF THE DRAWINGS

FIG. 2C shows a scheme of an illustrative embodiment illustrating a dominance relationship between a data set and a specific group of data set;

FIG. 3 shows a block diagram of an illustrative embodiment illustrating a computer program product that is arranged for selecting a preferred data set.

SUMMARY

Figure 1:
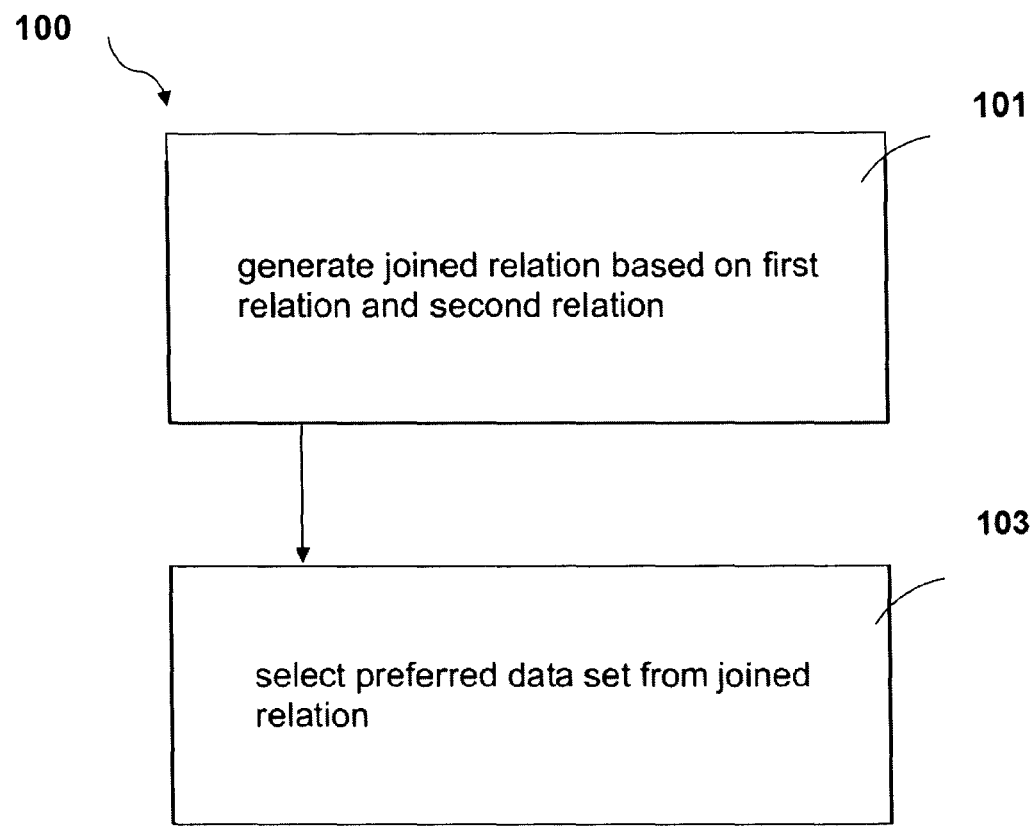
FIG. 1 is a flow chart of an illustrative embodiment of a method for selecting a preferred data set.

Some embodiments of the present disclosure may generally relate to methods for selecting a preferred data set. One example method may include generating a joined relation based on a first relation having a first join attribute and a first existence probability attribute, and a second relation having a second join attribute compatible with the first join attribute and a second existence probability attribute, wherein the joined relation comprises a skyline probability attribute based at least in part on the product of a second value of the first existence probability attribute and a third value of the second existence probability attribute; and selecting the preferred data set from the joined relation based on a comparison between the first value of the skyline probability attribute and a predetermined threshold.

Additional embodiments of the present disclosure may generally relate to computer-readable mediums containing instructions for selecting a preferred data set. One example computer-readable medium may contain instructions, which when executed by a computing device, causes the computing device to generate a joined relation based on a first relation having a first join attribute and a first existence probability attribute, and a second relation having a second join attribute compatible with the first join attribute and a second existence probability attribute, wherein the joined relation comprises a skyline probability attribute based at least in part on the product of a second value of the first existence probability attribute and a third value of the second existence probability attribute; and to select the preferred data set from the joined relation based on a comparison between the first value of the skyline probability attribute and a predetermined threshold.

Other embodiments of the present disclosure may generally relate to a computing device configured to select a preferred data set. One example computing device includes a processing unit. The processing unit is configured to generate a joined relation based on a first relation having a first join attribute and a first existence probability attribute, and a second relation having a second join attribute compatible with the first join attribute and a second existence probability attribute, wherein the joined relation comprises a skyline probability attribute based at least in part on the product of a second value of the first existence probability attribute and a third value of the second existence probability attribute; and to select the preferred data set from the joined relation based on a comparison between the first value of the skyline probability attribute and a predetermined threshold.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn, inter alia, to methods, apparatus, computer programs, and systems of selecting a preferred data set.

In this disclosure, the term "skyline computation" generally refers to an approach to address a problem of multi-criteria decision making where there is no clear preference function over the attributes. Instead, such computation attempts to get an overall picture of which objects dominate other objects based on one or more preset preferences. The term "skyline probability" generally refers to a probability that an object is part of a data set obtained as a result of a skyline computation. A "local attribute" is an attribute in a relation on which a preference is applied for a skyline computation, but no aggregation operation with another attribute is performed. An "aggregate attribute" is an attribute in a relation on which an aggregation operation is performed with another attribute to obtain an aggregated value. A preference is generally applied on the aggregated value for the skyline computation. A "join attribute" is an attribute in a relation on which no preferences are specified. A join attribute is used to specify the join conditions between two different relations to form the joined relation. An "existence probability attribute" is an attribute in a relation. The "existence probability" generally refers to a probability associated with a tuple in the relation. It denotes whether the tuple exists or not. A "joined tuple" is a tuple that is formed by combining a tuple in a first relation and a tuple in a second relation using the join attributes of the respective tuples. A first tuple "fully dominates" a second tuple if (a) at least one local attribute in the first tuple is preferred over the respective local attribute in the second tuple, while the rest of the local attributes in the first tuple are considered equal to or preferred over the respective local attributes in the second tuple, (b) at least one aggregate attribute in the first tuple is preferred over the respective aggregate attribute in the second tuple, while the rest of the aggregate attributes in the first tuple are considered equal to or preferred over the respective aggregate attributes in the second tuple, and (c) the join attributes in the first tuple are equal to or preferred over in respect to the join condition over the respective join attributes in the second tuple. A first tuple "locally dominates" a second tuple if (a) at least one local attribute in the first tuple is preferred over the respective local attribute in the second tuple, while the rest of the local attributes in the first tuple are equal to or preferred over the respective local attributes in the second tuple and (b) the joint attributes in the first tuple are equal to or preferred over in respect to the join condition over the respective join attributes in the second tuple. "Target tuples" for a joined tuple of a joined relation is a set of joined tuples in the joined relation which may dominate the joined tuple In some embodiments, the multiple criteria decision analysis may include a skyline computation. A skyline computation has wide applications. For example, one application involves selecting hotels that are cheap and close to the beach. After the skyline computation, hotels in the computed preferred data set are better than those not in the preferred set because they are superior in at least one attribute, cost or closeness to the beach, while being equivalent or better in all other attributes. Another example may include selecting a combination of a camera and a memory card in which the total price is the lowest, the image resolution of the camera is the highest, and the capacity of the memory card is the highest. The multiple criteria decision analysis may be more complicated when the existence of a tuple in a relation is uncertain. In some embodiments, there are two types of uncertainties. In an existentially uncertain relation, values of all attributes are exactly specified, but the tuple itself exists with only a probability (i.e., existence probability). In a locationally uncertain relation, each tuple exists with certainty, but its attribute values are not exactly specified and are described by a probability distribution function.

In some embodiments, a locationally uncertain relation is converted to an existentially uncertain relation. For example, the locationally uncertain relation includes a first locationally uncertain tuple having a first attribute value with a first probability and a second attribute value with a second probability, the first locationally uncertain tuple is converted to an existentially uncertain tuple. The existentially uncertain tuple includes a first attribute value, a second attribute value and an existence probability of the product of the first probability and the second probability.

For example, Table A and Table B show examples of the two types of uncertain relations. Table A is an existentially uncertain relation. Table B is a locationally uncertain relation.

TABLE A existentially uncertain relation

| flight number | duration | cost | existence probability |
|---|---|---|---|
| 11 | 2 hours 10 minutes | 162 | 0.8 |
| 12 | 2 hours | 166 | 0.9 |
| 13 | 1 hour 50 minutes | 173 | 0.5 |
| 14 | 1 hour 55 minutes | 140 | 0.7 |

TABLE B locationally uncertain relation

| flight number | Duration | | Cost | |
| | Value | existence probability | value | existence probability |
|---|---|---|---|---|
| 11 | 2 hours 10 minutes | 0.8 | 162 | 0.7 |
| 11 | 3 hours 20 minutes | 0.2 | 215 | 0.3 |
| 12 | 2 hours | 1.0 | 166 | 0.6 |
| 12 | 2 hours | 1.0 | 282 | 0.4 |

In some embodiments, the locationally uncertain relation is converted to a new existentially uncertain relation as shown in Table C. Table C includes an existence probability tuple which is the product of a first probability and a second probability of a locationally uncertain tuple in Table B.

It worth notes that the skyline probability of a tuple in an existentially uncertain relation is greater or equal to the skyline probability of the respective tuple in a locationally uncertain relation which the existentially uncertain relation is converted from. Therefore, when there is a query which includes a skyline probability threshold, if a tuple in the existentially uncertain relation is less than the skyline probability threshold, the respective tuple in the locationally uncertain relation is also less than the skyline probability threshold and thus the respective tuple will not be a part of the skyline. If a tuple in the existentially uncertain relation is greater than or equal to the skyline probability threshold, the respective tuple in the locationally uncertain relation needs to be further examined to determine whether it is a part of the skyline.

TABLE C existentially uncertain relation generated from locationally uncertain relation

| flight number | Duration | cost | existence probability |
|---|---|---|---|
| 11 | 2 hours 10 minutes | 162 | 0.56 |
| 11 | 2 hours 10 minutes | 215 | 0.24 |
| 11 | 3 hours 20 minutes | 162 | 0.14 |
| 11 | 3 hours 20 minutes | 215 | 0.06 |
| 12 | 2 hours | 166 | 0.6 |
| 12 | 2 hours | 282 | 0.4 |

In some embodiments, a data set may be a relation (or table) in a relational database and the preferred data set may be computed as a result set for a Structured Query Language (SQL) query. In some embodiments, a data set may be a flat file. In some other embodiments, a data set may be a set of tuples in a non-relational database. In yet other embodiments, a data set may be a set of tuples in a semi-structured data store. The example embodiments discussed henceforth are directed towards computing a preferred data set in a relational database system. However, it will be apparent to those of ordinary skill in the art, that the proposed technique may be applied to data sets other than those stored in a relational database system.

FIG. 1 is a flow chart of an illustrative embodiment of a method 100 for selecting a preferred data set associated with the skyline computation. In step 101, the method generates a joined relation based on a first relation and a second relation. The first relation includes a first join attribute, a first aggregate attribute and a first existence probability attribute. The second relation includes a second join attribute, a second aggregate attribute and a second existence probability attribute. The first join attribute is compatible with the second join attribute and a logical relationship exists between the first join attribute and the second join attribute. Some example logical relationships include equality and inequality. In some other embodiments, the first relation and the second relation may both be part of a single relation in a relational database.

The joined relation includes a total attribute having a value that is based on aggregating a value associated with the first aggregate attribute and a value associated with the second aggregate attribute. The aggregating is associated with a monotonic function, for example, a sum function, an average function, a minimum function, or a maximum function. The joined relation may further include a first local attribute selected from the first relation. The joined relation may further include a second local attribute selected from the second relation.

The joined relation further includes a total existence probability attribute. The total existence probability attribute has a value that is a product of a value associated with the first existence probability attribute and a value associated with the second existence probability attribute.

The joined relation further includes a skyline probability attribute having a first value associated with the product of a value of the first existence probability attribute and a value of the second existence probability attribute. The method continues in step 103.

In step 103, the method selects a preferred data set from the joined relation based on a comparison between the first value of the skyline probability attribute and a predetermined threshold, the value of the total attribute and/or a value of the first local attribute. In some embodiments, when the first value is greater than the predetermined threshold, the tuple having the first value may be one of the preferred data set. In some embodiments, a tuple in the joined relation may be compared to all other tuples in the joined relation to determine whether the tuple is the preferred data set.

In some other embodiments, to determine whether a tuple is the preferred data set, the tuple may not have to be compared with all other tuples in the joined relation. Instead, the tuple may be compared to a number of target tuples in the joined relations to determine whether the tuple is the preferred data set and the skyline probability of the tuple.

The skyline probability of the tuple is associated with the total existence probability of the tuple. In some embodiments, when a tuple is not fully dominated by any other tuple in the joined relation, the skyline probability of the tuple is the total existence probability of the tuple. In some other embodiments, when a first tuple is fully dominated by a second tuple in the joined relation, the first tuple is preferred only if the second tuple does not exist. The probability of the second tuple not existing is "1-the total existence probability of the second tuple." Therefore, the skyline probability of the first tuple is the product of (1) the total existence probability of the first tuple and (2) "1-the total existence probability of the second tuple."

In the embodiments of selecting a number of target tuples for a tuple in the joined relation to determine whether the tuple is the preferred data set, methods for selecting the preferred data set from the joined relation further include retaining a fully dominated tuple in the first relation. The fully dominated tuple is fully dominated by at least one other tuple in the first relation.

After retaining a fully dominated tuple in the first relation, the rest tuples in the first relation are retained as non-fully dominated tuples. The methods further include retaining one or more locally dominating tuples in the non-fully dominated tuples. The rest of the non-fully dominated tuples are locally non-dominating tuples in the first relation.

Similarly, fully dominated tuples, non-fully dominated tuples, locally dominating tuples and locally non-dominating tuples in the second relation may be retained. Accordingly, nine possible joining approaches to generate the joined relation exist. The joining approaches include, without limitation, (1) joining a locally dominating tuple in the first relation with a locally dominating tuple in the second relation, (2) joining a locally dominating tuple in the first relation with a locally non-dominating tuple in the second relation, (3) joining a locally dominating tuple in the first relation with a fully dominated tuple in the second relation, (4) joining a locally non-dominating tuple in the first relation with a locally dominating tuple in the second relation, (5) joining a locally non-dominating tuple in the first relation with a locally non-dominating tuple in the second relation, (6) joining a locally non-dominating tuple in the first relation with a fully dominated tuple in the second relation, (7) joining a fully dominated tuple in the first relation with a locally dominating tuple in the second relation, (8) joining a fully dominated tuple in the first relation with a locally non-dominating tuple in the second relation and (9) joining a fully dominated tuple in the first relation with a fully dominated tuple in the second relation.

Accordingly, a joined tuple joined in accordance with the first approach set forth above is not fully dominated by any other joined tuples in the joined relation. Therefore, the skyline probability of the tuple is its total existence probability. The total existence probability is the product of the existence probability of the locally dominating tuple in the first relation and the existence probability of the locally dominating tuple in the second relation.

A joined tuple joined in accordance with the second and the fourth approaches set forth above is not fully dominated by any other tuples in the joined relation, because the locally non-dominating tuples in the first relation and the second relation are part of the non-fully dominated tuples in the first relation and the second relation. Therefore, the skyline probability of the tuple is its total existence probability. The total existence probability of the tuple is the product of the existence probability of the locally dominating tuple in the first relation and the existence probability of the locally non-dominating tuple in the second relation. Alternatively, the total existence probability of the tuple is the product of the existence probability of the locally dominating tuple in the second relation and the existence probability of the locally non-dominating tuple in the first relation.

For a first joined tuple formed by joining a locally dominating tuple in the first relation with a fully dominated tuple in the second relation, if the first joined tuple is dominated by a second joined tuple in the joined relation, the second joined tuple is also formed by joining the same locally dominating tuple. Therefore, to determine whether a first joined tuple joined in accordance with the third approach set forth above is in the preferred data set, the target tuples for such a first joined tuple include (1) a tuple joined in accordance with the first approach set forth above and (2) a tuple joined in accordance with the second approach set forth above. In addition, the skyline probability of such a first joined tuple is determined based on whether the tuple is fully dominated by any joined tuple joined in accordance with the first or the second approaches set forth above.

In some embodiments, if the first joined tuple is not fully dominated by any joined tuple formed in accordance with the first or the second approaches set forth above, the skyline probability of the first joined tuple is the product of the existence probability of the locally dominating tuple in the first relation and the existence probability of the fully dominated tuple in the second relation. If the skyline probability of the first joined tuple is greater than a threshold, the first joined tuple is a part of the preferred data set.

In some embodiments, if the first joined tuple is fully dominated by a second joined tuple formed in accordance with the first or the second approaches set forth above, the skyline probability of the first joined tuple is the product of (a) the product of the existence probability of the locally dominating tuple in the first relation and the existence probability of the fully dominated tuple in the second relation and (b) 1-the total existence probability of the second joined tuple. If the skyline probability of the first joined tuple is greater than a threshold, the first joined tuple is a part of the preferred data set.

In some embodiments, if the first joined tuple is fully dominated by a second joined tuple and a third joined tuple both formed in accordance with the first or the second approaches set forth above, the skyline probability of the first joined tuple is the product of (a) the total existence probability of the first joined tuple, (b) 1-the total existence probability of the second joined tuple and (c) 1-the total existence probability of the third joined tuple.

For a first joined tuple formed by joining a locally dominating tuple in the second relation with a fully dominated tuple in the first relation, if the first joined tuple is dominated by a second joined tuple in the joined relation, the second joined tuple is also formed by joining the same locally dominating tuple. Therefore, to determine whether a first joined tuple joined in accordance with the seventh approach set forth above is in the preferred data set, the target tuples for such a joined tuple include (1) a joined tuple joined in accordance with the first approach set forth above and (2) a joined tuple joined in accordance with the fourth approach set forth above. The skyline probability of such joined tuple is determined based on whether such tuple is fully dominated by any joined tuple joined in accordance with the first or the fourth approaches set forth above.

In some embodiments, if the first joined tuple is not fully dominated by any joined tuple formed in accordance with the first or the fourth approaches set forth above, the skyline probability of the first joined tuple is the product of the existence probability of the fully dominated tuple in the first relation and the existence probability of the locally dominating tuple in the second relation. If the skyline probability of the first joined tuple is greater than a threshold, the first joined tuple is a part of the preferred data set.

In some embodiments, if the first joined tuple is fully dominated by a second joined tuple formed in accordance with the first or the fourth approaches set forth above, the skyline probability of the first joined tuple is the product of (a) the product of the existence probability of the fully dominated tuple in the first relation and the existence probability of the locally dominating tuple in the second relation and (b) 1-the total existence probability of the second joined tuple. If the skyline probability of the first joined tuple is greater than a threshold, the first joined tuple is a part of the preferred data set.

In some embodiments, if the first joined tuple is fully dominated by a second joined tuple and a third joined tuple both formed in accordance with the first or the second approaches set forth above, the skyline probability of the first joined tuple is the product of (a) the total existence probability of the first joined tuple, (b) 1-the total existence probability of the second joined tuple and (c) 1-the total existence probability of the third joined tuple.

To determine whether a first joined tuple joined in accordance with the fifth, the sixth, the eighth or the ninth approaches set forth above is the preferred data set, the target tuples for such tuple include joined tuples joined in accordance with all the nine approaches set forth above. The skyline probability of the first joined tuple is determined based on whether the tuple is fully dominated by any joined tuple joined in accordance with any of the nine approaches set forth above.

In some embodiments, if the first joined tuple is not fully dominated by any joined tuple formed in accordance with any of the nine approaches set forth above, the skyline probability of the first joined tuple is the total existence probability of the first joined tuple.

In some embodiments, if the first joined tuple is fully dominated by a second joined tuple formed in accordance with any of the nine approaches set forth above, the skyline probability of the first joined tuple is the product of (a) the total existence probability of the first joined tuple and (b) 1-the total existence probability of the second joined tuple. If the skyline probability of the first joined tuple is greater than a threshold, the first joined tuple is a part of the preferred data set.

In some embodiments, if the first joined tuple is fully dominated by a second joined tuple and a third joined tuple both formed in accordance with the first or the second approaches set forth above, the skyline probability of the first joined tuple is the product of (a) the total existence probability of the first joined tuple, (b) 1-the total existence probability of the second joined tuple and (c) 1-the total existence probability of the third joined tuple.

In some other embodiments, the target tuples for a joined tuple joined in accordance with the fifth approach set forth above may be further decreased. The first stage set of locally non-dominating tuples in the first or the second relation are further divided into a second stage set of locally dominating tuples and a second stage set of locally non-dominating tuples based on the local attributes. The dividing may be iterated until local dominating tuples cannot be found or while the cardinality of the last stage non-local candidate tuple is less than a preset threshold.

Following the same approach of selecting locally dominating tuples and locally non-dominating tuples as set forth above, the first stage set of locally non-dominating tuples in the first or the second relation may be further divided into a second stage set of locally dominating tuples and a second stage set of locally non-dominating tuples. A tuple in the second stage set of locally dominating tuples at least locally dominates a tuple in the first stage set of locally non-dominating tuples.

As set forth above, a dominance relationship exists among a stage set of locally dominating tuples and locally non-dominating tuples. For a tuple in the joined relation joined based on a stage set of locally dominating tuples, the target tuples for such tuple is one or more tuples in the joined relation joined based on the same locally dominating tuples. Therefore, the number of target tuples for a tuple may be reduced.

For example, $A_f$ or $A_0$ denotes non-fully dominated tuples in the first relation, $A_{f'}$ or $A_0'$ denotes fully dominated tuples in the first relation, $A_{fl}$ or $A_1$ denotes first stage set of locally dominating tuples in the first relation and $A_{fl'}$ or $A_1'$ denotes first stage set of locally non-dominating tuples in the first relation. The first stage set of locally non-dominating tuples of $A_{fl'}$ or $A_1'$, may further divided to a second stage set of locally dominating tuples of $A_{fl'1}$ or $A_2$ and a second stage set of locally non-dominating tuples of $A_{fl'1}$ or $A_2'$.

Similarly, $B_f$ or $B_0$ denotes non-fully dominated tuples in the second relation, $B_{f'}$ or $B_0'$ denotes fully dominated tuples in the second relation, $B_{fl}$ or $B_1$ denotes first stage set of locally dominating tuples in the second relation and $B_{fl}$ or $B_1'$ denotes first stage set of locally non-dominating tuples in the second relation. The first stage set of locally non-dominating tuples of $B_{fl}$ or $B_1'$ may further divided to a second stage set of locally dominating tuples of $B_{fl'}$ or $B_2$ and a second stage set of locally non-dominating tuples of $B_{fl'1}$ or $B_2'$.

Based on the dominance relationship, a tuple joined based on $A_i$ and $B_j$ may be compared to some specific target tuples to determine whether the tuple is the preferred data set. For example, a tuple joined based on $A_2$ and $B_2$ is compared with tuples joined based on $A_1$ and $B_1$, and unnecessary comparisons with tuples joined based on (1) $A_1$ and $B_1'$, (2) $A_1'$ and $B_1$ or (2) $A_1'$ and $B_1'$ are as a result eliminated.

Figure 2A:
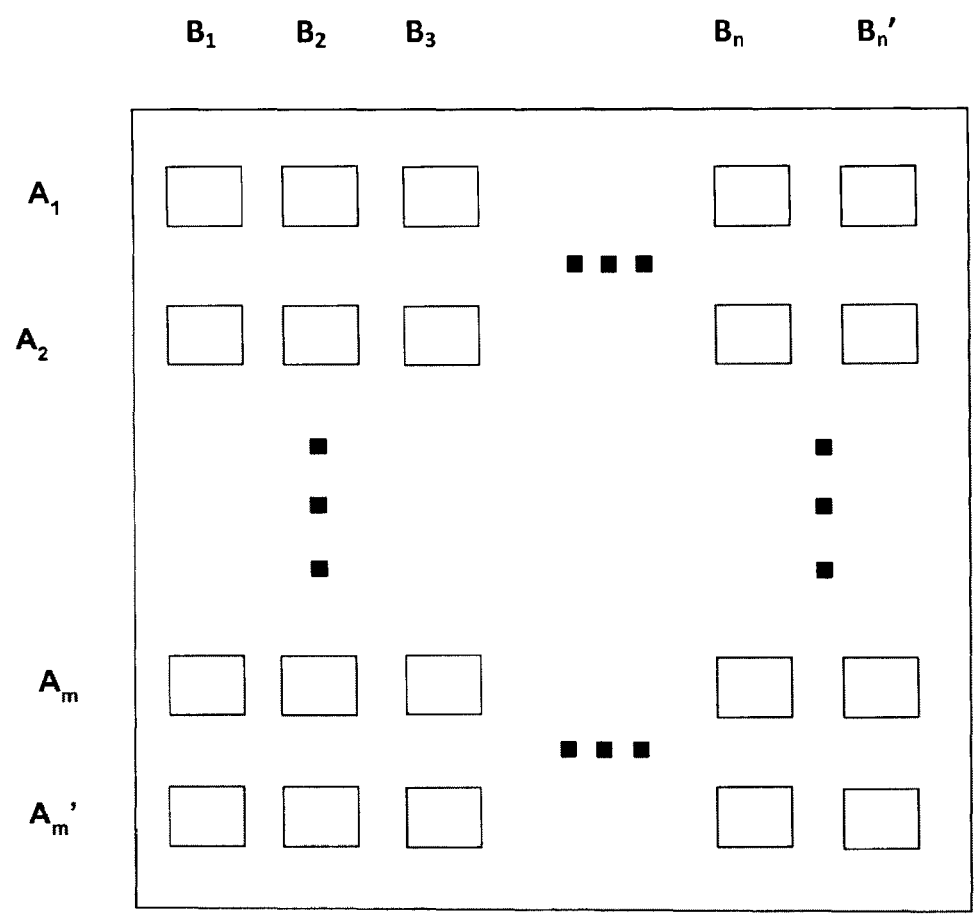
FIG. 2A shows a scheme of an illustrative embodiment of a categorization of a first data set and a second data set.
Figure 2B:
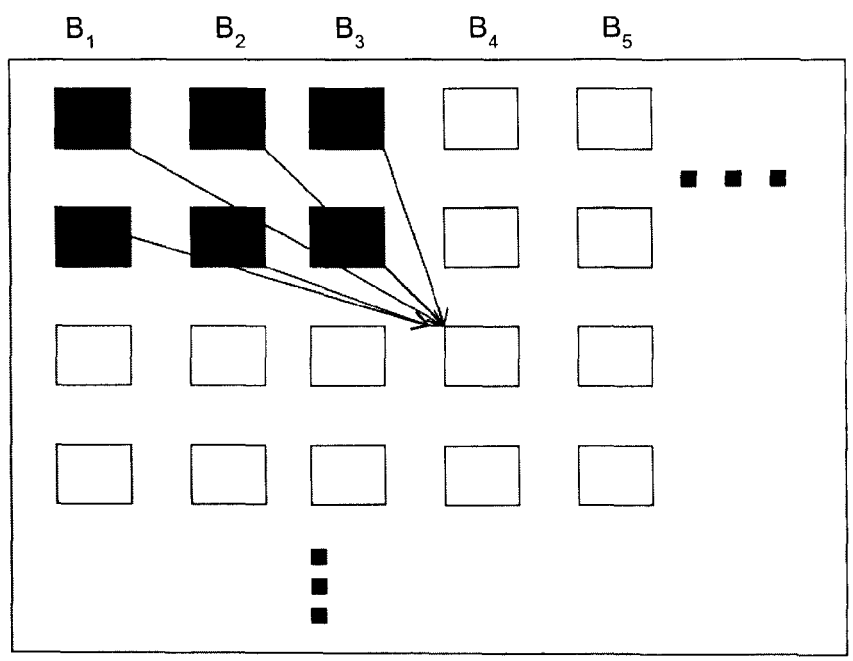
FIG. 2B shows a scheme of an illustrative embodiment illustrating a dominance relationship between a data set and a specific group of data set.
Figure 2C:
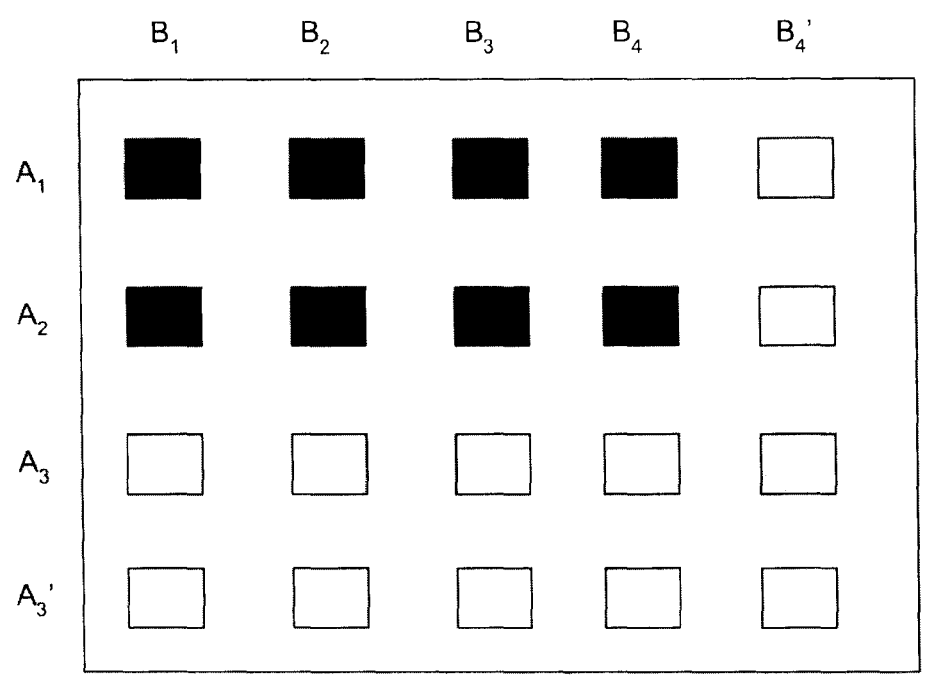

FIGS. 2A, 2B, and 2C illustrate the construction of example target tuples. The first relation is categorized into m stages set of locally dominating tuples. The second relation is categorized into n stages set of locally dominating tuples. FIG. 2A shows the joined relation of the first relation and the second relation. Each block corresponds to tuples joined based on the same $A_i$ and $B_j$, where i=1 to m, and j=1 to n. A block may initially include both locally dominating tuples and locally non-dominating tuples. As the iterative algorithm progresses, such block may include only the same stage set of locally dominating tuples or the different stages set of locally dominating tuples.

The dominators of a record in set $A_i$ obtained in an iteration lie only in sets that are obtained in iterations before it, i.e., $A_1, A_2, \ldots, A_{i-1}$. Therefore, dominators of the tuple of $A_i \times B_j$ lie in a tuple of $A_k \times B_l$, where k=1, 2 ... i−1, and l=1, 2 ... j−1. This is shown in FIG. 2B. The grey block includes the tuples in the joined relation under consideration and the black blocks are the target tuples for the grey block. Similarly, the target tuples for a tuple of $A_m' \times B_j$ are tuples of $A_k \times B_l$ where k is 1, 2, ... m, and l is 1, 2, ... j−1. The target tuples for a tuple of $A_m \times B_j'$ are tuples of $A_o \times B_p$ where o is 1, 2, ... m−1, and p is 1, 2, ... j, as illustrated in FIG. 2C.

Using the selection of a preferred travel plan from City A to City B as an example, Table 1 shows flights from City A and Table 2 shows flights to City B. When there is no direct flight from City A to City B, the travel plan includes two separate flights combined from Table 1 and Table 2. A flight in Table 1 or Table 2 has a certain probability of not being canceled (i.e., existence probability). In such embodiments, the travel plan needs a connection hub for transit. In addition, the arrival time of the first flight to the connection hub must be earlier than the departure time of the second flight from the connection hub. The connection hub and arrival and departure times may be the join attributes. At the same time, the travel plan includes overall cost and duration, which may be the aggregate attributes. The travel plan further includes rating and amenities for the first flight and for the second flight, which may be the local attributes. Further, the travel plan includes a total existence probability for the first flight and the second flight, and a skyline probability calculated based on the total existence probability.

TABLE 1

Flights from City A

| Fno | Dep | arr | dest | duration | Cost | amn | rating | prob |
|---|---|---|---|---|---|---|---|---|
| 11 | 06:30 | 08:40 | C | 2 h 10 m | 162 | 5 | 4 | 0.8 |
| 12 | 07:00 | 09:00 | E | 2 h 00 m | 166 | 4 | 5 | 0.9 |
| 13 | 12:00 | 13:50 | C | 1 h 50 m | 173 | 4 | 3 | 0.5 |
| 14 | 08:05 | 10:00 | E | 1 h 55 m | 140 | 3 | 4 | 0.7 |
| 15 | 09:50 | 10:40 | C | 1 h 40 m | 270 | 3 | 2 | 0.8 |
| 16 | 16:00 | 17:30 | D | 1 h 30 m | 230 | 3 | 3 | 0.3 |
| 17 | 17:00 | 20:20 | C | 3 h 20 m | 183 | 4 | 3 | 0.9 |

TABLE 2

Flights to City B

| Fno | Src | dep | arr | duration | Cost | amn | rating | prob |
|---|---|---|---|---|---|---|---|---|
| 21 | C | 09:50 | 12:00 | 2 h 10 m | 162 | 5 | 4 | 0.4 |
| 22 | D | 17:00 | 19:00 | 2 h 00 m | 166 | 4 | 5 | 0.7 |
| 23 | C | 16:00 | 18:45 | 2 h 45 m | 160 | 4 | 4 | 0.8 |
| 24 | E | 20:00 | 21:30 | 1 h 30 m | 160 | 4 | 3 | 0.3 |
| 25 | D | 16:00 | 17:49 | 1 h 49 m | 220 | 3 | 4 | 0.6 |
| 26 | C | 16:00 | 18:49 | 2 h 49 m | 160 | 2 | 3 | 0.9 |
| 27 | E | 20:00 | 21:46 | 1 h 46 m | 200 | 3 | 3 | 0.8 |

In the embodiments set forth above, the first relation is Table 1 and the second relation is Table 2. The "arr" and "dest" of Table 1 are join attributes of the first relation. The "src" and "dep" of Table 2 are join attributes of the second relation. The "cost" and "duration" of Table 1 are aggregate attributes of the first relation. The "cost" and "duration" of Table 2 are aggregate attributes of the second relation. The sum of the "cost" of Table 1 and the "cost" of Table 2 is an aggregate attribute. The sum of the "duration" of Table 1 and the "duration" of Table 2 is another aggregate attribute. The "prob" in Table 1 and Table 2 are the existence probability attributes of the first relation and the second relation, respectively. The local attributes include "amn" and "rating" of Table 1 and "amn" and "rating" of Table 2. To select the preferred travel plan, it includes joining Table 1 and Table 2 based on the join attributes and generating one or more total attributes by aggregating the aggregate attributes of Table 1 and Table 2 as shown in Table 3.

TABLE 3

Part of the joined results

| f1.fno | f2.fno | f1. dest | f1. arr | f2. Dep | f1. amn | f2. amn | f1. rating | f2. rating | Cost | duration | Total prob. | skyline prob. |
|---|---|---|---|---|---|---|---|---|---|---|---|---|
| 11 | 21 | C | 08:40 | 09:50 | 5 | 5 | 4 | 4 | 324 | 4 h 20 m | 0.32 | 0.320 |
| 11 | 23 | C | 08:40 | 16:00 | 5 | 4 | 4 | 4 | 322 | 4 h 55 m | 0.64 | 0.640 |
| 11 | 26 | C | 08:40 | 16:00 | 5 | 2 | 4 | 3 | 322 | 4 h 59 m | 0.72 | 0.259 |
| 12 | 24 | E | 09:00 | 20:00 | 4 | 4 | 5 | 3 | 326 | 3 h 30 m | 0.27 | 0.270 |
| 12 | 27 | E | 09:00 | 20:00 | 4 | 3 | 5 | 3 | 366 | 3 h 46 m | 0.72 | 0.526 |
| 13 | 23 | C | 13:50 | 16:00 | 4 | 4 | 3 | 4 | 333 | 4 h 35 m | 0.40 | 0.272 |
| 13 | 26 | C | 13:50 | 16:00 | 4 | 2 | 3 | 3 | 333 | 4 h 39 m | 0.45 | 0.134 |
| 14 | 24 | E | 10:00 | 20:00 | 3 | 4 | 4 | 3 | 300 | 3 h 25 m | 0.21 | 0.210 |
| 14 | 27 | E | 10:00 | 20:00 | 3 | 3 | 4 | 3 | 340 | 3 h 41 m | 0.56 | 0.323 |
| 15 | 23 | C | 10:40 | 16:00 | 3 | 4 | 2 | 4 | 430 | 4 h 25 m | 0.64 | 0.435 |
| 15 | 26 | C | 10:40 | 16:00 | 3 | 2 | 2 | 3 | 430 | 4 h 29 m | 0.72 | 0.013 |

Then, the preferred travel plan is selected from a joined relation (e.g., Table 3) joined by the first relation and the second relation through the skyline calculations. In some embodiments, the preferred travel plan is selected further based on a total attribute, a local attribute and a skyline probability attribute. Table 3 shows a part of the joined relation. As set forth above, the preferred travel plan includes the lowest total cost and duration, the best rating and amenities for the first flight and the second flight and the skyline probability (i.e., "skyline prob." In Table 3) greater than a threshold.

In Table 1, the tuples of flights 11, 13, 15 and 17 have one common join attribute (i.e., the same destination C). Among the four tuples, the tuple of flight 17 is fully dominated by the tuple of flight 11, because the tuple of flight 17 has a longer duration, a higher cost, less amenities, and a lower rating than the tuple of flight 11.

In Table 1, the tuple of flight 16 is not fully dominated by any other tuples because the tuple of flight 16 has a unique join attribute (i.e., destination D). The tuples of flights 12 and 14 have a common join attribute (i.e., the same destination E). However, neither of them is fully dominated by the other, because not all attributes of the tuple of flight 12 are preferred over or equal to the respective attributes of the tuple of flight 14 (e.g., the tuple of flight 14 has a shorter duration but a cheaper cost than the tuple of flight 12). Therefore, in Table 1, the tuple of flight 17 is fully dominated. The tuples of flights 11, 13, 15, 16, 12 and 14 are non-fully dominated.

Among flights 11, 13 and 15, the flight 11 has the most amenities and the highest rating than other flights. Therefore, the tuple of flight 11 is a locally dominating tuple. Similarly, the tuples of flights 12 and 16 are also locally dominating tuples. Accordingly, the tuples of flights 13, 15 and 14 are locally non-dominating tuples.

Following the similar approaches set forth above for determining whether a tuple is fully dominated, in Table 2, the tuples of flights 26 and 27 are fully dominated. The tuples of flights 21, 23, 22, 25 and 24 are not fully dominated.

For flights 21 and 23, the tuple of flight 21 is locally dominating tuple because flight 21 has more amenities than flight 23 while two flights have the same rating. Similarly, the tuples of flights 22 and 24 are locally dominating tuples. Accordingly, the tuples of flights 23 and 25 are locally non-dominating tuples.

As set forth above, for a tuple in Table 3 joined based on one of the tuples of flights 11, 12 and 16 in Table 1 and one of the tuples of 21, 22 and 24 in Table 2 (i.e., in accordance with the first joining approach set forth above), the tuple may be a preferred data set because the joined tuple is not fully dominated by any other tuple in Table 3. The skyline probability is the product of the existence probability of one of the tuples of flights 11, 12 and 16 in Table 1 and the existence probability of one of the tuples of 21, 22 and 24. For example, a joined tuple joined from the tuple of flight 11 and the tuple of flight 21 has a skyline probability of 0.32 which is the product of the existence probability of flight 11 (i.e., 0.8) and the existence probability of flight 21 (i.e., 0.4).

As set forth above, for a tuple in Table 3 joined based on one of the tuples of flights 11, 12 and 16 in Table 1 and one of the tuples of flights 23 and 25 in Table 2 (i.e., accordance with the second joining approach set forth above) or a tuple in Table 3 joined based on one of the tuples of flights 13, 14 and 15 in Table 1 and one of the tuples of flights 21, 22 and 24 in Table 2 (i.e., accordance with the fourth joining approach set forth above), the tuple may be a preferred data set because the joined tuple is not fully dominated by any other tuple in Table 3. The skyline probability of the tuple may be the product of the existence probabilities of flights 11, 12 or 16 and the existence probabilities of flights 23 or 25. Alternatively, the skyline probability of the tuple may be the product of the existence probabilities of flights 13, 14 or 15 and the existence probabilities of flights 21, 22 or 24.

For a tuple in Table 3 joined based on one of the tuples of flights 11, 12 and 16 in Table 1 and one of the tuples of flights 26 and 27 in Table 2 (i.e., accordance with the third joining approach set forth above), the target tuples for such tuple include a tuple joined based on (1) a tuple joined based on one of the tuples of flights 11, 12 and 16 in Table 1 and one of the tuples of 21, 22 and 24 in Table 2 and (2) a tuple joined based on one of the tuples of flights 11, 12 and 16 in Table 1 and one of the tuples of flights 23 and 25 in Table 2. For example, a tuple joined based on the tuple of flight 11 and the tuple of flight 26 in Table 3 may be compared to a tuple joined based on the tuple of flight 11 and the tuple of flight 23. The tuple joined based on the tuple of flight 11 and the tuple of flight 23 fully dominates the tuple joined based on the tuple of flight 11 and the tuple of flight 26. Therefore, the skyline probability of the tuple joined based on the tuple of flight 11 and the tuple of flight 26 is 0.72×(1−0.64)= 0.2592.

As set forth above, the first stage set of locally non-dominating tuples 13, 14 and 15 in Table 1 may be further divided into a second stage set of locally dominating tuples (i.e., flights 13 and 14) and a second stage set of locally non-dominating tuples (i.e., flight 15). The tuple of flight 15 is locally dominated by the tuple of flight 13 or the tuple of flight 14. Table 4 shows a fully dominated tuple of flight 17 as $A_f^t$, a first stage set of locally dominating tuples of flights 11, 12 and 16 as $A_{fl}$, a first stage set of locally non-dominating tuples of flights 13, 14 and 15 as $A_{fl}'$, a second stage set of locally dominating tuples of flights 13 and 14 as $A_{fl'1}$ and a second stage set of locally non-dominating tuples of flight 15 as $A_{fl'1}'$.

TABLE 4

Categorization of flights in Table 1

| Set | | | Flight Numbers |
|---|---|---|---|
| $A_f$ | $A_{fl}$ | | 11, 12, 16 |
| | $A_{fl}'$ | $A_{fl'1}$ | 13, 14 |
| | | $A_{fl'1}'$ | 15 |
| $A_f'$ | | | 17 |

Similarly, the first stage set of locally non-dominating tuples 23 and 25 in Table 2 may be further divided into a second stage set of locally dominating tuples (i.e., flight 23) and a second stage set of locally non-dominating tuples (i.e., flight 25). The tuple of flight 25 is locally dominated by the tuple of flight 23. Table 5 shows fully dominated tuples of flights 26 and 27 as $B_f'$, a first stage set of locally dominating tuples of flights 21, 22 and 24 as $B_{fl}$, a first stage set of locally non-dominating tuples of flights 23 and 25 as $B_{fl}'$, a second stage set of locally dominating tuple of flight 23 as $B_{fl'1}$, and a second stage set of locally non-dominating tuple of flight 25 as $B_{fl'1}'$.

TABLE 5

Categorization of flights in Table 2

| Set | | | Flight Numbers |
|---|---|---|---|
| $B_f$ | $B_{fl}$ | | 21, 22, 24 |
| | $B_{fl}'$ | $B_{fl'1}$ | 23 |
| | | $B_{fl'1}'$ | 25 |
| $B_f'$ | | | 26, 27 |

FIG. 3 shows a block diagram illustrating a computer program product that is arranged for selecting a preferred data set. The computer program product 300 may include a signal bearing medium 304, which may include one or more sets of executable instructions 302 that, when executed by, for example, a processor of a computing device, may provide at least the functionality described above and illustrated in FIG. 1.

In some implementations, the signal bearing medium 304 may encompass a non-transitory computer readable medium 308, such as, but not limited to, a hard disk drive, a Compact Disc (CD), a Digital Versatile Disk (DVD), a digital tape, memory, etc. In some implementations, the signal bearing medium 304 may encompass a recordable medium 310, such as, but not limited to, memory, read/write (R/W) CDs, R/W DVDs, etc. In some implementations, the signal bearing medium 304 may encompass a communications medium 306, such as, but not limited to, a digital and/or an analog communication medium (e.g., a fiber optic cable, a waveguide, a wired communications link, a wireless communication link, etc.) The computer program product 300 may also be recorded in the non-transitory computer readable medium 308 or another similar recordable medium 310.

Figure 4:
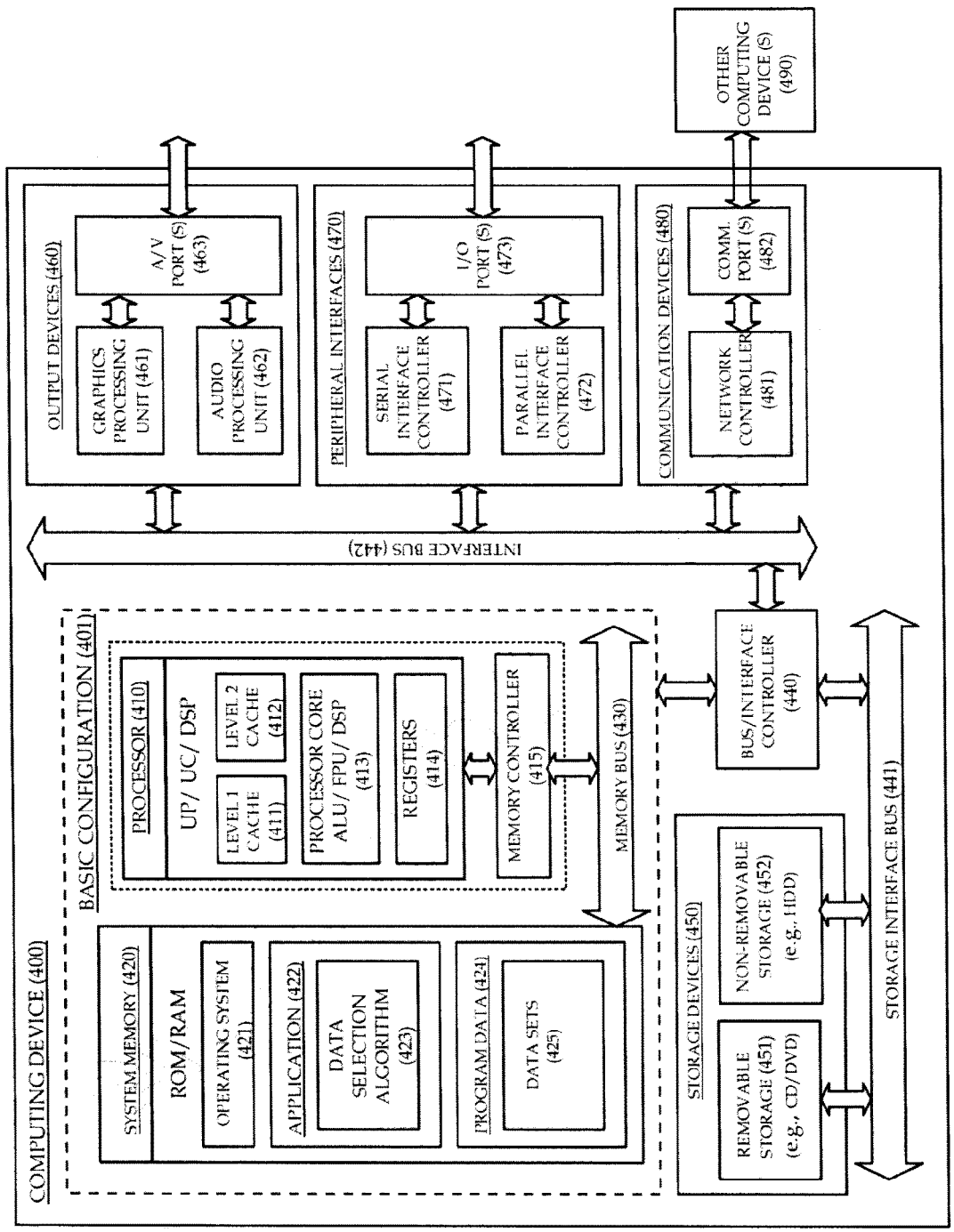
FIG. 4 shows a block diagram of an illustrative embodiment of a computing device that is arranged for selecting a preferred data set.

FIG. 4 shows a block diagram of an illustrative embodiment of a computing device that is arranged for selecting a preferred data set. In a very basic configuration 401, computing device 400 typically includes one or more processors 410 and a system memory 420. A memory bus 430 may be used for communicating between processor 410 and system memory 420.

Depending on the desired configuration, processor 410 may be of any type including but not limited to a microprocessor (μP), a microcontroller (μC), a digital signal processor (DSP), or any combination thereof. Processor 410 may include one more levels of caching, such as a level one cache 411 and a level two cache 412, a processor core 413, and registers 414. An example processor core 413 may include an arithmetic logic unit (ALU), a floating point unit (FPU), a digital signal processing core (DSP Core), or any combination thereof. An example memory controller 415 may also be used with processor 410, or in some implementations memory controller 415 may be an internal part of processor 410.

Depending on the desired configuration, system memory 420 may be of any type including but not limited to volatile memory (such as RAM), non-volatile memory (such as ROM, flash memory, etc.) or any combination thereof. System memory 420 may include an operating system 421, one or more applications 422, and program data 424. In some embodiments, application 422 may include a data selection algorithm 423 that is arranged to perform the functions as described herein including those described with respect to the steps 101 and 103 of the method 100 of FIG. 1. Program data 424 may include data sets 425 that may be useful for the operation of data selection algorithm 423 as will be further described below. In some embodiments, the data sets 425 may include, without limitation, the first data set and the second data set of block 101 of FIG. 1. In some embodiments, application 422 may be arranged to operate with program data 424 on operating system 421, such that implementations of selecting preferred data set may be provided as described herein. This described basic configuration 401 is illustrated in FIG. 4 by those components within the inner dashed line.

In some other embodiments, application 422 may include data selection algorithm 423 that is arranged to perform the functions as described herein including those described with respect to the steps 101 and 103 of the method 100 of FIG. 1.

Computing device 400 may have additional features or functionality, and additional interfaces to facilitate communications between basic configuration 401 and any required devices and interfaces. For example, a bus/interface controller 440 may be used to facilitate communications between basic configuration 401 and one or more data storage devices 450 via a storage interface bus 441. Data storage devices 450 may be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 420, removable storage devices 451 and non-removable storage devices 452 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 442 for facilitating communication from various interface devices (e.g., output devices 460, peripheral interfaces 470, and communication devices 480) to basic configuration 401 via bus/interface controller 440. Example output devices 460 include a graphics processing unit 461 and an audio processing unit 462, which may be configured to communicate to various external devices such as a display or speakers via one or more A/V ports 463. Example peripheral interfaces 470 include a serial interface controller 471 or a parallel interface controller 472, which may be configured to communicate with external devices such as input devices (e.g., keyboard, mouse, pen, voice input device, touch input device, etc.) or other peripheral devices (e.g., printer, scanner, etc.) via one or more I/O ports 473. An example communication device 480 includes a network controller 481, which may be arranged to facilitate communications with one or more other computing devices 490 over a network communication link via one or more communication ports 482. In some embodiments, the other computing devices 490 may include other applications, which may be operated based on the results of the application 422.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method to select a preferred data set, the method comprising:

processing, by one or more processors, a first relation to retain a set of tuples in the first relation, wherein the set of tuples includes at least one of a fully dominated tuple, a locally dominated tuple, and a non-locally dominated tuple in the first relation, wherein the retained set of tuples comprises a first set of tuples that corresponds to the fully dominated tuple in the first relation, and wherein the first relation comprises a first join attribute and a first existence probability attribute;

processing, by the one or more processors, a second relation to retain another set of tuples in the second relation, wherein the another set of tuples includes at least one of a fully dominated tuple, a locally dominated tuple, and a non-locally dominated tuple in the second relation, wherein the retained another set of tuples comprises a second set of tuples that corresponds to the locally dominated tuple in the second relation, and wherein the second relation comprises a second join attribute and a second existence probability attribute;

generating, by the one or more processors, a joined relation based on the first relation and the second relation, wherein the joined relation comprises a first joined tuple which is joined based on a tuple from the first set of tuples and a tuple from the second set of tuples, and wherein the joined relation comprises a skyline probability attribute based, at least in part, on a product of a value of the first existence, probability attribute and a value of the second existence probability attribute; and selecting, by the one or more processors, the preferred data set from the joined relation based on a comparison of a first value of the skyline probability attribute and a skyline probability threshold, wherein the selecting further comprises:

comparing the first joined tuple with one or more target tuples in the joined relation to determine whether the first mined tuple is fully dominated by the one or more target tuples, wherein the one or more target tuples comprise tuples formed by joining the tuple from the second set of tuples with the set of tuples in the first relation; and selecting the first joined tuple based on a determination that the first joined tuples is not dominated by the one or more target tuples, wherein the comparison of the first joined tuple with the one or more target tuples in the joined relation eliminates unnecessary comparisons with tuples formed by joining one or more tuples from the set of tuples the first relation with one or more tuples from the another set of tuples in the second relation.

2. The method of claim 1, further comprising processing, by the one or more processors, the first relation to retain a third set of tuples in the first relation which are non-fully dominated tuples, wherein the non-fully dominated tuples of the third set include at least one of the locally dominated tuple and the non-locally dominated tuple of the first relation.

3. The method of claim 2, further comprising selecting a first tuple from the second set of tuples, wherein the first tuple locally dominates a second tuple from the second set of tuples.

4. The method of claim 3, wherein the joined relation comprises a second joined tuple which is joined based on the first tuple selected from the second set of tuples and a third tuple selected from the third set of tuples.

5. The method of claim 4, wherein a second value of the skyline probability attribute of the second joined tuple includes the product of the value of the first existence probability attribute and the value of the second existence probability attribute.

6. The method of claim 1, wherein the first value of the skyline probability attribute of the first joined tuple includes a product of the value of the second existence probability attribute of the tuple selected from the second set of tuples and the value of the first existence probability attribute of the tuple selected from the first set of tuples.

7. The method of claim 3, further comprising identifying a fourth tuple of the second relation which locally dominates the second tuple.

8. The method of claim 3, further comprising identifying a dominance relationship among the first tuple and other tuples in the second relation based on a first local attribute of the second relation.

9. The method, of claim 1, wherein the first existence probability attribute is generated from a product of a first probability and a second probability of a first locationally uncertain tuple in the first relation.

10. A non-transitory computer-readable storage medium encoded with computer-executable instructions to select a preferred data set, which in response to execution by a computing device, cause the computing device to perform or control performance of operations that comprise:
process a first relation to retain a set of tuples in the first relation, wherein the set of tuples includes at least one of a fully dominated tuple, a locally dominated tuple, and a non-locally dominated tuple in the first relation, wherein the retained set of tuples comprises a first set of tuples that corresponds to the fully dominated tuple in the first relation, and wherein the first relation includes a first join attribute and a plurality of first existence probability attributes;
process a second relation to retain another set of tuples in the second relation, wherein the another set of tuples includes at least one of a fully dominated tuple, a locally dominated tuple, and a non-locally dominated tuple in the second relation, wherein the retained another set of tuples comprises a second set of tuples that corresponds to the locally dominated tuple in the second relation, wherein the second relation includes a second join attribute compatible with the first join attribute and a plurality of second existence probability attributes, and wherein the first join attribute is compatible with the second joined attribute based at least on a logical relationship between the first join attribute and the second join attribute;
generate a joined relation based on the first relation and the second relation, wherein the joined relation comprises a first joined tuple which is joined based on a tuple from the first set of tuples and a tuple from the second set of tuples, and wherein the joined relation further comprises a skyline probability attribute based, at least in part, on a product of a value of the plurality of first existence probability attributes and a value of plurality of the second existence probability attributes; and
select the preferred data set from the joined relation based on a comparison of a first value of the skyline probability attribute and a skyline probability threshold;
compare a first joined tuple with one or more target tuples in the joined relation to determine whether the first joined tuple is fully dominated by the one or more target tuples, wherein the one or more target tuples comprise tuples formed by joining the tuple from the second set of tuples with the set of tuples in the first relation; and
select the first joined tuple based on a determination that the first joined tuple is not dominated by the one or more target tuples, wherein the comparison of the first joined tuple with the one or more target tuples in the joined relation eliminates unnecessary comparisons with tuples formed by joining one or more tuples from the set of tuples in the first relation with one or more tuples from the another set of tuples in the second relation.

11. The computer-readable storage medium of claim 10, wherein the operations further comprise:
process the first relation to retain a third set of tuples in the first relation which are non-fully dominated tuples, wherein the non-fully dominated tuples of the third set include at least one of the locally dominated tuple and the non-locally dominated tuple of the first relation.

12. The computer-readable storage medium of claim 11, wherein the operations further comprise:
select a first tuple from the second set of tuples, wherein the first tuple locally dominates a second tuple from the second set of tuples.

13. The computer-readable storage medium of claim 12, wherein the joined relation comprises a second joined tuple which is joined based on the first tuple selected from the second set of tuples and a third tuple selected from the third set of tuples.

14. The computer-readable storage medium of claim 13, wherein a second value of the skyline probability attribute of the second joined tuple includes the product of the value of the plurality of the first existence probability attributes and the value of the plurality of the second existence probability attributes.

15. The computer-readable storage medium of claim 10, wherein the first value of the skyline probability attribute of the first joined tuple includes a product of the value of the second existence probability attribute of the tuple selected from the second set of tuples and the value of the first existence probability attribute of the tuple selected from the first set of tuples.

16. The computer-readable storage medium of claim 12, wherein the operations further comprise:
identify a fourth tuple of the second relation which locally dominates the second tuple.

17. The computer-readable storage medium of claim 15, wherein the operations further comprise:
identify a dominance relationship among the first tuple and other tuples in the second relation based on a first local attribute of the second relation.

18. The computer-readable storage medium of claim 10, wherein a first existence probability attribute, of the plurality of first existence probability attributes, is generated from a product of a first probability and a second probability of a first locationally uncertain tuple in the first relation.

19. A computing device configured to select a preferred data set, the computing device comprising:
a processing unit, wherein the processing unit is configured to:
process a first relation to retain a set of tuples in the first relation, wherein the set of tuples includes at least one of a fully dominated tuple, a locally dominated tuple, and a non-locally dominated tuple in the first relation, wherein the retained set of tuples comprises a first set of tuples that corresponds to the fully dominated tuple in the first relation, and wherein the first relation includes a first join attribute and a first existence probability attribute;
process a second relation to retain another set of tuples in the second relation, wherein the another set of tuples includes at least one of a fully dominated tuple, a locally dominated tuple, and a non-locally dominated tuple in the second relation, wherein the retained another set of tuples comprises a second set of tuples that corresponds to the locally dominated tuple in the second relation, wherein the second relation includes a second join attribute compatible with the first join attribute and a second existence probability attribute, and wherein the first join attribute is compatible with the second joined attribute based at least on a logical relationship between the first join attribute and the second join attribute;
generate, a joined relation based on the first relation and the second relation, wherein the joined relation comprises a first joined tuple which is joined based on a tuple from the first set of tuples and a tuple from the second set of tuples, and wherein the joined relation further comprises a skyline probability attribute based, at least in part, on a product of a value of the first existence probability attribute and a value of the second existence probability attribute; and
select, the preferred data set from the joined relation based on a comparison of a first value of the skyline probability attribute and a skyline probability threshold;
compare the first joined tuple with one or more target tuples in the joined relation to determine whether the first joined tuple is fully dominated by the one or more target tuples, wherein the one or more target tuples comprise tuples formed by joining the tuple from the second set of tuples with the set of tuples in the first relation; and
select the first joined tuple based on a determination that first joined tuple is not dominated by the one or more target tuples, wherein the comparison of the first joined tuple with the one or more target tuples in the joined relation eliminates unnecessary comparisons with tuples formed by joining one or more tuples from the set of tuples in the first relation with one or more tuples from the another set of tuples in the second relation.

20. The computing device of claim 19, wherein the processing unit is further configured to process the first relation to retain a set of tuples in the first relation which are non-fully dominated tuples, wherein the non-fully dominated tuples of the third set include at least one of the locally dominated tuple and the non-locally dominated tuple of the first relation.

21. The computing device of claim 20, wherein the processing unit is further configured to select a first tuple from the second set of tuples, wherein the first tuple locally dominates a second tuple from the second set of tuples.

22. The computing device of claim 21, wherein the joined relation comprises a second joined tuple which is joined based on the first tuple selected from the second set of tuples and a third tuple selected from the third set of tuples.

23. The computing device of claim 22, wherein a second value of the skyline probability attribute of the first joined tuple includes the product of the value of the first existence probability attribute and the value of the second existence probability attribute.

24. The computing device of claim 19, wherein the first value of the skyline probability attribute of the second joined tuple is a product of the value of the second existence probability attribute of the first tuple selected from the second set of tuples and the value of the first existence probability attribute of the fourth tuple selected from the third set of tuples.

25. The computing device of claim 21, wherein the processing unit is further configured to identify a fourth tuple of the second relation which locally dominates the second tuple.

26. The computing device of claim 21, wherein the processing unit is further configured to identify a dominance relationship among the First tuple and other tuples in the second relation based on a first local attribute of the second relation.

27. The computing device of claim 19, wherein the first existence probability attribute is generated from a product of a first probability and a second probability of a first locationally uncertain tuple in the first relation.

* * * * *

UNITED STATES PATENT AND TRADEMARK OFFICE
CERTIFICATE OF CORRECTION

PATENT NO. : 10,007,883 B2
APPLICATION NO. : 14/429064
DATED : June 26, 2018
INVENTOR(S) : Arnab Bhattacharya Page 1 of 1

It is certified that error appears in the above-identified patent and that said Letters Patent is hereby corrected as shown below:

In the Claims

Claim 1, Column 18, Line 60, delete "first mined" and insert --first joined--;
Column 18, Line 66, delete "tuples" and insert --tuple--; and
Column 19, Line 4, insert --in-- after "set of tuples".

Claim 17, Column 21, Line 1, delete "15" and insert --12--.

Claim 20, Column 22, Line 16, insert --third-- after "retain a".

Claim 26, Column 22, Line 47, delete "First" and insert --first--.

Signed and Sealed this
Twentieth Day of August, 2019

Andrei Iancu
*Director of the United States Patent and Trademark Office*